(12) United States Patent  
Dahlenburg et al.

(10) Patent No.: US 6,937,433 B2  
(45) Date of Patent: Aug. 30, 2005

(54) WINDAGE SUPPRESSION DEVICE AND ASSOCIATED METHOD FOR A RETRACTABLE AIR FLOW CONTROL

(75) Inventors: Rodney Dale Dahlenburg, Minneapolis, MN (US); Mark August Toffle, St. Louis Park, MN (US); Brent Melvin Weichelt, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 459 days.

(21) Appl. No.: 10/040,215

(22) Filed: Jan. 2, 2002

(65) Prior Publication Data

US 2002/0181148 A1 Dec. 5, 2002

Related U.S. Application Data

(60) Provisional application No. 60/295,275, filed on Jun. 1, 2001.

(51) Int. Cl.$^7$ .............................................. G11B 33/14
(52) U.S. Cl. .................................................. 360/97.03
(58) Field of Search ........................... 360/97.02, 97.03

(56) References Cited

U.S. PATENT DOCUMENTS

| | | | |
|---|---|---|---|
| 5,031,059 A | * | 7/1991 | Yamaguchi et al. ..... 360/97.03 |
| 5,666,239 A | | 9/1997 | Pottebaum |
| 5,696,649 A | * | 12/1997 | Boutaghou ............... 360/97.03 |
| 5,757,587 A | | 5/1998 | Berg et al. |
| 5,999,372 A | | 12/1999 | Peterson et al. |
| 6,172,843 B1 | | 1/2001 | Genheimer et al. |
| 6,449,119 B1 | * | 9/2002 | Hashizume et al. ..... 360/97.03 |
| 6,496,327 B2 | * | 12/2002 | Xia et al. ................. 360/97.03 |
| 6,542,328 B2 | * | 4/2003 | Harrison et al. ......... 360/97.03 |
| 6,545,842 B2 | * | 4/2003 | Rao et al. ................. 360/244.2 |
| 6,549,366 B1 | * | 4/2003 | Ichiyama ................. 360/97.03 |

* cited by examiner

*Primary Examiner*—A. J. Heinz  
(74) *Attorney, Agent, or Firm*—Fellers, Snider, et al.

(57) ABSTRACT

An air flow control device for reducing turbulence on a rotating multi-disc stack. Air flow control device includes a first air dam having cavities formed by a series of alternating plate sections forming gaps therebetween adjacent plates. Gaps define cavities capable of receiving discs when disc stack is rotating. A method for writing data onto an annular writeable surface of a plurality of discs including the steps of mounting the plurality of discs into a coaxial stack, extending one or more dam plates each between a consecutive pair of the plurality of discs and adjacent at least a selected one of the writeable surfaces; and writing data onto the selected surface while a first one of the dam plates overlaps enough of the selected surface so that the first dam plate limits a windage-induced error in the written data.

20 Claims, 6 Drawing Sheets

WINDAGE SUPPRESSION DEVICE AND ASSOCIATED METHOD FOR A RETRACTABLE AIR FLOW CONTROL

RELATED APPLICATIONS

This application claims the benefit of priority of U.S. provisional application Ser. No. 60/295,275, filed Jun. 1, 2001.

FIELD OF THE INVENTION

This invention relates generally to the field of digital data storage devices, and more particularly, but not by way of limitation, to a device for controlling air flow near the write heads in a multi-disc servowriter.

BACKGROUND OF THE INVENTION

Modern data handling and storage devices, such as disc drives, are commonly used in a multitude of computer environments to store large amounts of data in a form that is readily available to a host computer. Generally, a disc drive has a magnetic disc, or two or more stacked magnetic discs, that are rotated by a motor at high speed. Each disc typically has two data storage surfaces each divided into a series of generally concentric data tracks where data is stored in the form of magnetic flux transitions.

A data transfer member such as a magnetic transducer or "head" is moved by an actuator arm to selected positions adjacent the data storage surface to sense the magnetic flux transitions in reading data from the disc, and to transmit electrical signals to induce the magnetic flux transitions in writing data to the disc. The active elements of the data transfer member, such as magnetoresistive head element and an interactive write element, are supported by a suspension structure extending from the actuator arm. The active elements fly at a height slightly above the data storage surface upon an air bearing generated by air currents caused by the spinning discs.

A continuing trend in the industry is toward ever-increasing data storage capacity and processing speed while maintaining or reducing the physical size of the disc drive. Consequently, the data transfer member and supporting structures are continually being miniaturized, and data storage densities are continually being increased. The result is an overall increased sensitivity to excitation both from external sources and from self-excitation sources, which adversely affect the positioning control systems moving the actuator relative to the spinning discs.

One such source of excitation results from air currents moving within the disc stack and impinging on disc drive components. Kinetic energy of the rotating discs is transferred by a shearing action through the boundary layer at the air/disc interface to impart movement to air mass within the disc stack, thereby inducing air currents. The air currents generally spiral outwardly, as the disc rotation imparts a rotational force component and as centrifugal force imparts a radial force component. The velocity is related to the radial location; that is, air moving near the disc axis of rotation moves relatively slowly, and is more likely a laminar flow. As the radial distance from the axis of rotation increases, the currents move faster and become more likely a turbulent flow. In either case, when the currents impinge upon an object, such as the data transfer member and/or the actuator, turbulence is likely. Turbulence can impart adverse vibrations, or aerodynamic excitation, to the discs (flutter) and/or to the actuator, particularly to the suspension members (buffeting). Turbulence can also be created by shedding vortices action on the actuator as the currents flow past the actuator, and acting on the disc as the currents are expelled from the disc stack.

Disc stacks are also becoming used is in servo-writing operations where discs are written with servo data before the discs are placed into a head-disc assembly. To increase throughput from such servowriting operations, the number of discs placed on a disc stack is being increased. Also, as data density on the discs increases, more precise control of the disc stack during write operations is required. Because the quality of the data written to the discs depends, in part, on the position stability of the write heads as they fly over the disc surfaces, there is a need for a method and device to reduce turbulence in the vicinity of the write elements and the assemblies on which the write elements are carried. The present invention, described below, provides a solution to this and other problems, and offers other advantages over the prior art.

SUMMARY OF THE INVENTION

Embodiments of the present invention contemplate a windage suppression device for a data handling system that writes data to a rotating disc. The device comprises an airflow control that is operably moveable between an engaged position and a disengaged position. The airflow control comprises spatially separated and substantially parallel plates defining a cavity between the plates, wherein in the engaged position a portion of the disc is receivingly engaged inside the cavity and in the disengaged position the disc is disposed outside the cavity. The data handling system can include two of more discs supported in a disc stack, wherein the airflow control comprises a plurality of plates defining a plurality of cavities that are each respectively engageable with one of the discs.

In one aspect of the present invention the data handling system includes a moveable actuator that positions a write element with respect to the disc. The airflow control comprises a dam that is engageable with a portion of the disc downstream of the actuator with respect to the disc rotation. The airflow control can furthermore comprise a stripper that is engageable with a portion of the disc upstream of the actuator with respect to the disc rotation.

The airflow control can comprise a pivoting support assembly for operative articulating engagement with the disc. For example, the dam and stripper can be independently pivotally supported, and can be connected by a linkage for transferring movement therebetween. The airflow control can comprise an arcuate outer boundary adjacent an edge to the disc. The air dam and stripper can rotate oppositely for engaging opposing radial portions of the disc. The airflow control can comprise an engaging assembly connected to one of the air dam and stripper for selective movement between the engaged and disengaged position. The airflow control device can, in the engaged position, provide a receiving engagement of the disc in the cavity to include a radial portion of the disc including substantially the writeable surface of the disc. The dam and stripper can comprise opposing edges such that in the disengaged position the clearance between the opposing edges is greater than a diameter of the disc.

Embodiments of the present invention contemplate a method of writing data a rotating disc. The method comprises moving an airflow control device to a disengaged position; supporting the disc to a rotary element adapted to rotate the disc; moving the airflow control device to an engaged position whereat a portion of the disc is receivingly engaged in a cavity defined by the airflow control device; and moving a writing element to selected positions of the disc. After writing, the method comprises moving the airflow control device back to the disengaged position clearingly disposing the disc outside the cavity; and removing the disc from the rotary element. The moving the airflow control device can comprise moving an air dam that is engageable with a portion of the disc downstream of the writing element with respect to the disc rotation. The moving the airflow control device can comprise moving a stripper that is engageable with a portion of the disc upstream of the writing element with respect to the disc rotation. The moving the airflow control device can comprise pivotally moving the airflow control device.

Embodiments of the present invention contemplate a windage suppression device for a data handling system that writes data to a rotating disc. The device comprises an airflow control comprising opposing plates defining a cavity therebetween the plates, and means for moving the airflow control between an engaged position and a disengaged position for selectively disposing the disc inside and outside, respectively, the cavity. The means for moving can be characterized by engaging a dam portion of the airflow control with a portion of the disc downstream of a writing element with respect to the disc rotation and engaging a stripper portion of the airflow control with a portion of the disc upstream of the writing element. The means for moving can be characterized by pivotal motion.

Against this backdrop the present invention has been developed. In one exemplary embodiment, the invention is directed to a data handling system including a plurality of discs operably mounted to a spindle assembly. The spindle assembly is capable of rotating the plurality of discs. The data handling system further includes means for supporting at least one stationary baffle extending between two of the plurality of discs while the discs rotate, so as to reduce any windage-induced disturbance.

Another embodiment is an air flow control device for a data handling system in which the data handling system has a stack of rotating discs on a spindle, each recording surface of each disc having a corresponding transducer adjacent thereto for operably reading data from and writing data to the corresponding recording surface. The air flow control device has an air dam including a first baffle arrangement having a plurality of spaced plate sections disposed transverse from an inner wall of the air dam. The plate sections are substantially parallel and forming gaps therebetween adjacent plate sections, each gap capable of receiving a corresponding disc therein when the air dam is engaged with the disc stack.

In another exemplary embodiment, the invention is directed to a method of writing data onto an annular writeable surface of a plurality of discs. The method includes mounting the plurality of discs into a coaxial stack. Next, one or more dam plates are each extended between a consecutive pair of the plurality of discs and adjacent at least a selected one of the writeable surfaces. Data is then written onto the selected surface while, at least first one of the dam plates overlaps enough of the selected surface so that the first dam plate limits a windage-induced error in the written data.

These and various other features as well as advantages which characterize the present invention will be apparent from a reading of the following detailed description and a review of the associated drawings.

DETAILED DESCRIPTION

Figure 1:
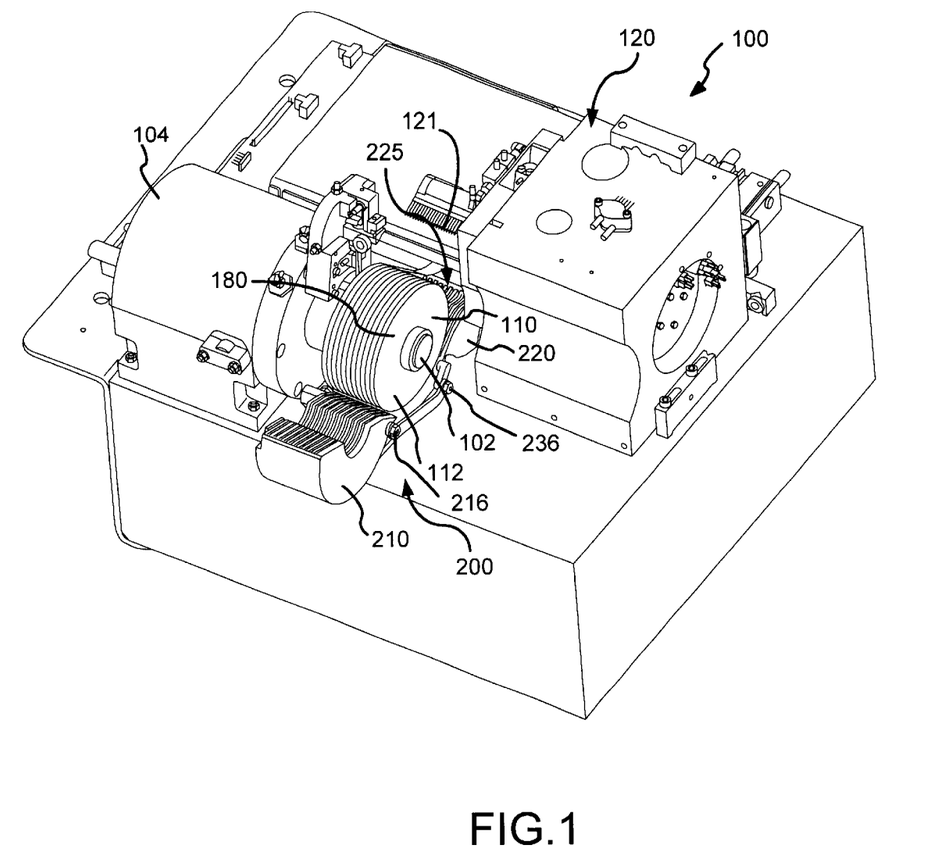
FIG. 1 is a perspective view of a multi-disc writer incorporating an example embodiment of an air flow control device of the present invention.
Figure 2:
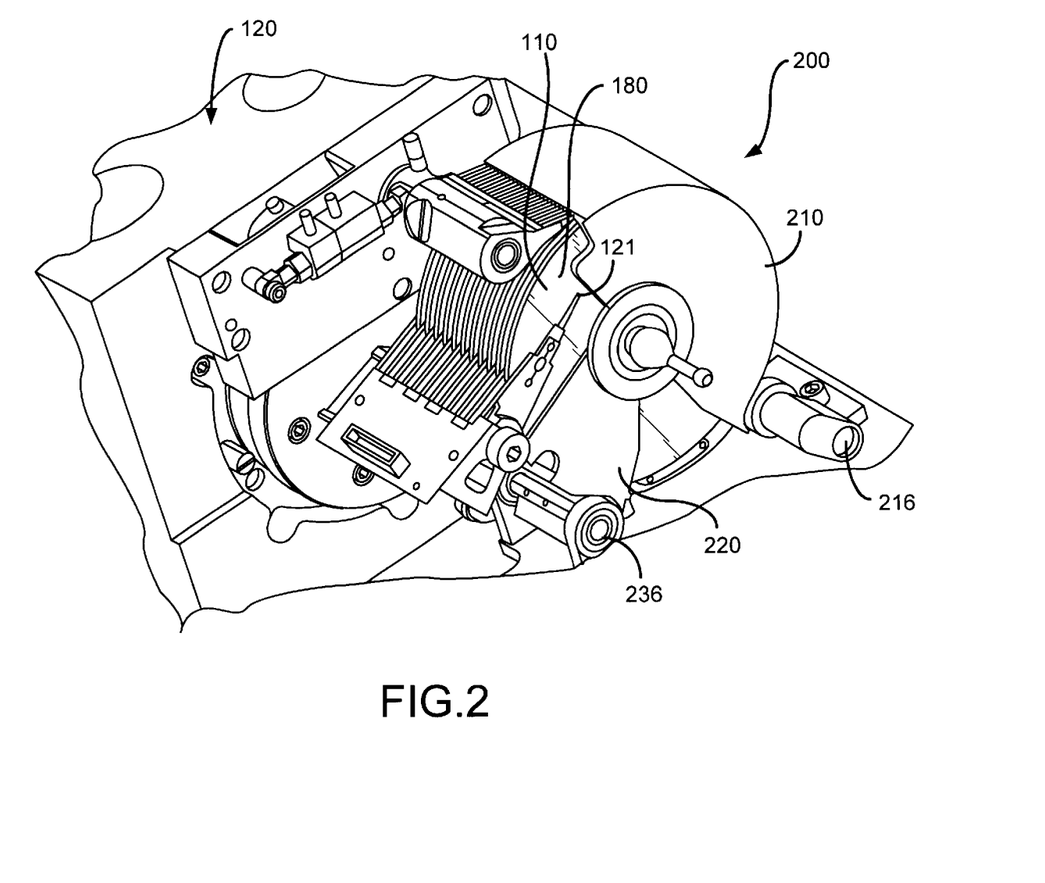
FIG. 2 is a close up perspective view of the multi-disc writer shown in FIG. 1 with the disc spin motor removed.

Referring now to FIGS. 1 and 2, shown is a multi-disc writer 100 incorporating an example embodiment of an air flow control device 200 of the present invention. This multi-disc writer 100 is used to write servo data to a multi-disc stack 110 of discs 112. Each disc 112 has at least one and preferably two writeable surfaces 180. The disc stack 110 is mounted on a drive motor spindle assembly 102 driven by a motor 104. The disc stack 110 can be removed and mounted to the motor 104 using the spindle assembly 102 which can be repeatedly removed from the motor 104 and replaced with a new disc stack 110 whenever it is desired to write data to a new disc stack 110. A plurality of discs 112 can be written simultaneously by engaging the actuator assembly 120 containing write heads (not shown) located on the actuator assembly 120. The actuator assembly 120 containing write heads can be indexed to write one or both surfaces 180 of each disc 112 in the disc stack 110.

Figure 5:
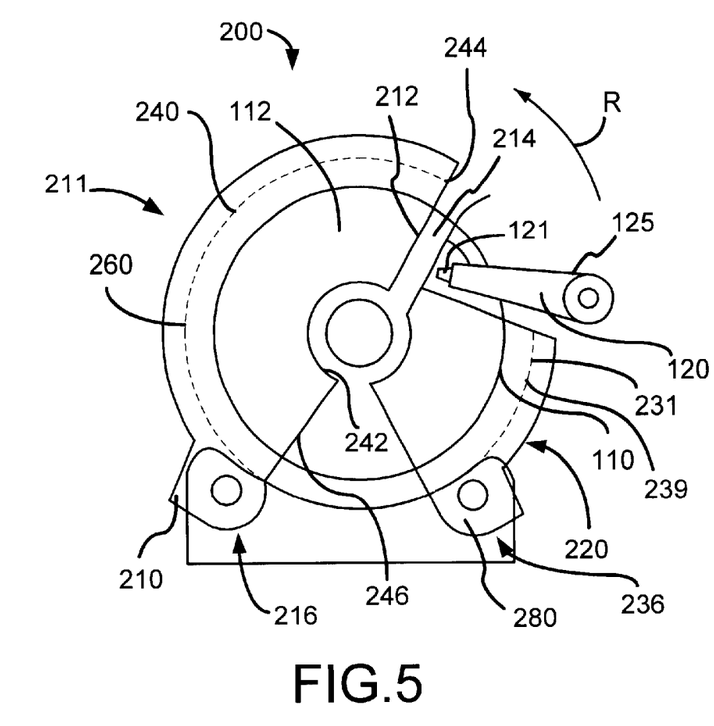
FIG. 5 is a side elevational view of a section of the air flow control device of FIG. 1, shown engaging a disc stack.

The multi-disc writer 100 includes an air flow control device 200 for reducing air flow in the region of the actuator assembly 120 write heads 121 (shown in FIG. 2) when the heads are engaged to write discs 112 in the disc stack 110. In the example embodiment shown, the air flow control device 200 includes a dam 210 and a stripper 220. Referring to FIG. 5, the air flow control device 200 is shown engaging the disc stack 110. With the air flow control device 200 engaged, discs 112 in the disc stack 110 rotate counterclockwise, that is, in the direction of arrow R. The dam 210 includes a leading edge section 212 wherein the rotating discs 112 are moving into the leading edge 212 relative to the direction R of disc rotation. A high-pressure zone 214 is created where the dam 210 retards air from entering the leading edge 212 of the dam 210. The stripper 220, also in an engagement position, reduces air flow created by the discs 112 in direction of the heads 121 of actuator assembly 120.

Figure 6:
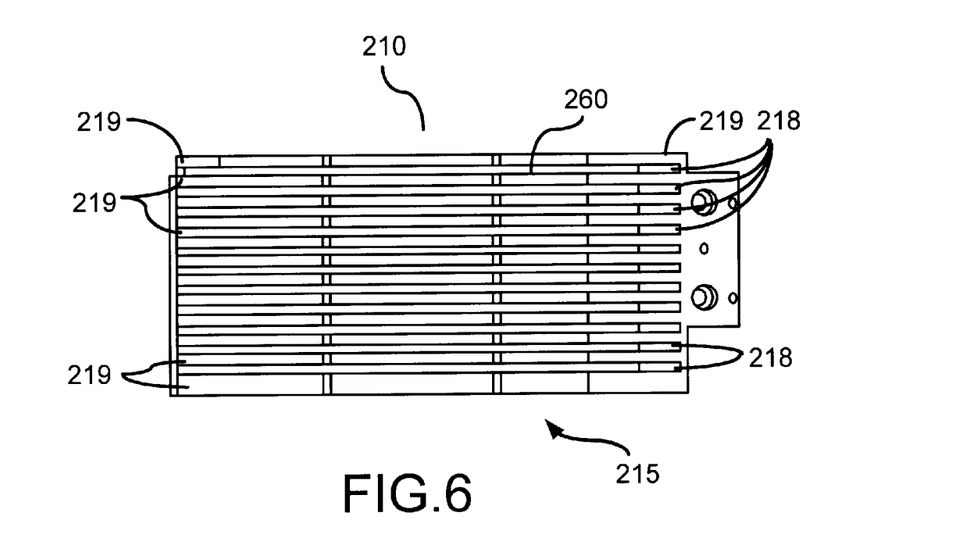
FIG. 6 is a bottom view of a portion of the air flow control device of FIG. 1.

Referring to FIGS. 5 and 6, the dam 210 includes a stationary baffle arrangement 215 having a series of alternating gaps 218 and plates 219. The dam also includes an outer section 211 having an inner wall 260. The gap 218 defines a cavity having an outer boundary 240, a first edge 244 and a second edge 246 and an inner boundary 242. The outer boundary 240 is bounded by the inner wall 260 and is generally arcuately shaped. The cavities formed by the gaps 218 are preferably wedge-shaped sections approximating that of section of the disc 112 which is contained within the cavity. The first and second edge boundaries 244, 246 extend transversely from the inner wall 260 of the outer boundary 240 of the dam 210. The first edge 244 creates a high pressure zone 214 when the discs 112 are rotating. The dam 210 can be engaged and disengaged to disc stack 110 (FIG. 1) by rotating the dam 210 around the dam pivot assembly 216. In the example embodiment shown in FIGS. 1 and 2, to obtain the open or disengagement position, the dam 210 is pivoted away from the discs 112 around the pivot assembly 216.

Figure 3:
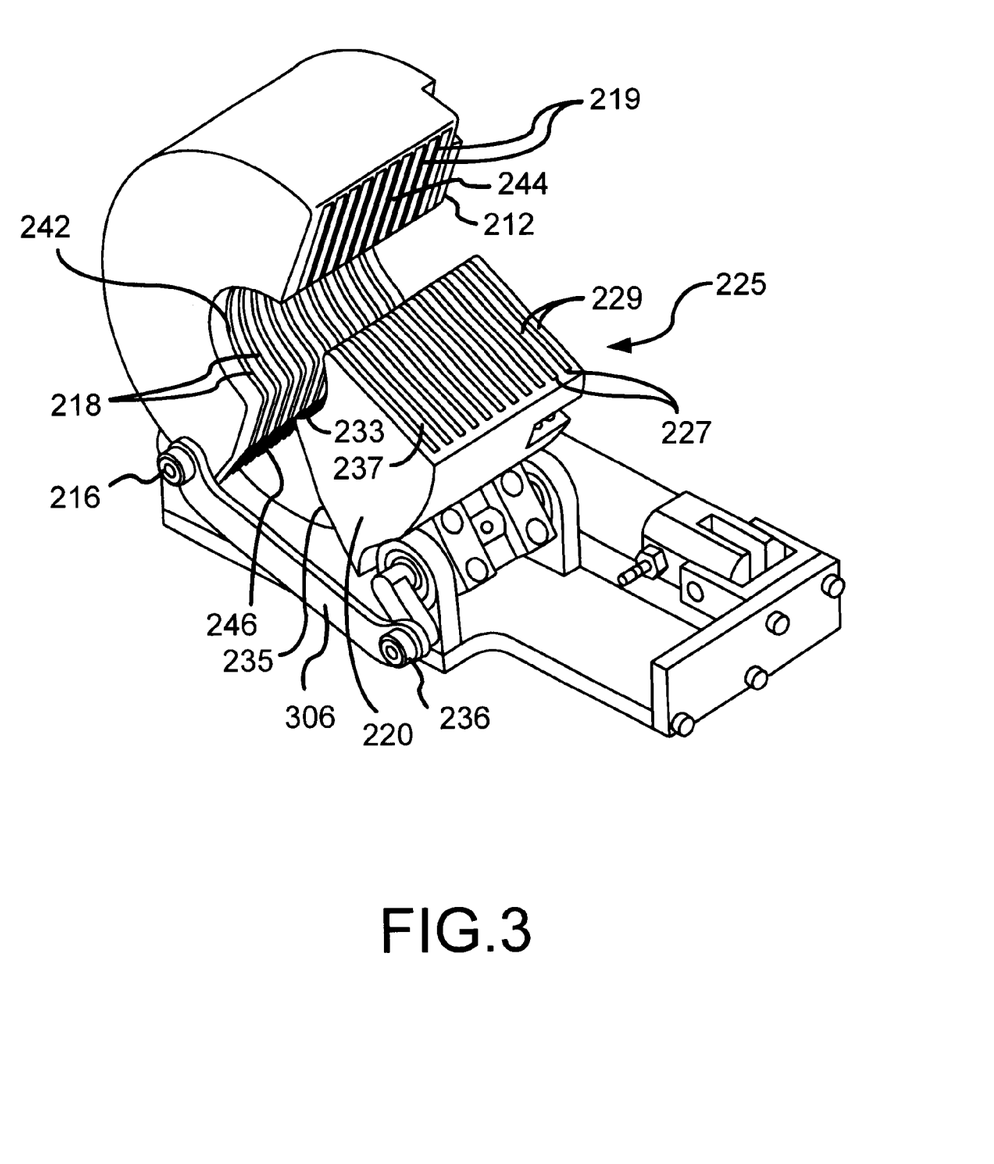
FIG. 3 is a perspective front view of the air flow control device of FIG. 1.
Figure 4:
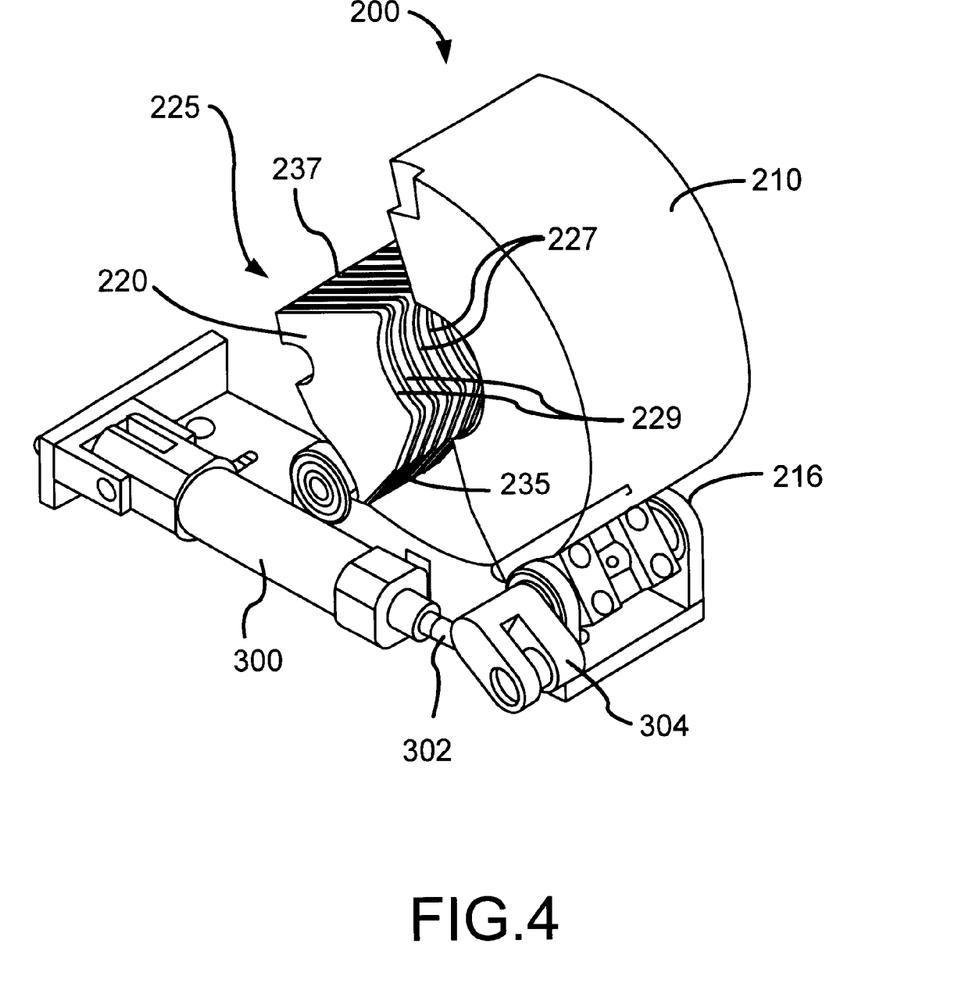
FIG. 4 is a rear perspective view of the air flow control device of FIG. 1.

Referring to FIGS. 3, 4 and 5, the stripper 220 includes a stripper pivot assembly 236, which allows the stripper 220 to be engaged and disengaged from the discs 112 in the disc stack 110. The stripper 220 also includes a second stationary baffle arrangement 225 having a series of alternating gaps 227 and plates 229. The gap 227 defines a cavity having an outer boundary 231, an inner boundary 233, a first edge 235 and a second edge 237. The outer boundary 231 is arcuately shaped, preferably being a wedge-shaped section approximately a section of the disc 112 that is contained within the cavity. The first and second edges 235, 237, extend transversely from an inner wall 239 of the outer boundary 231 of the stripper 220. The second edge 237 reduces air that is entrained by rotating discs 112 that impact the heads 121, thereby reducing or eliminating writing errors. Referring again to FIG. 1, the dam 210 and the stripper 220 are shown disengaged from the disc stack 110. In this position, the spindle assembly 102 can be removed from the motor 104 and a replacement spindle assembly 102 containing a new disc stack 110 to be written by the heads 121 in the actuator assembly 120 can be inserted into the motor 104 without interference by the dam 210 and the stripper 220. In FIG. 2 the dam 210 is then engaged to the disc stack 110 by rotating dam 210 around the pivot assembly 216 until the dam 210 is positioned on disc stack 110 as desired. Similarly, the stripper 220 is engaged to the disc stack 110 by rotating it around the stripper pivot assembly 236 until the stripper 220 is in desired position proximate to the disc stack 110.

FIG. 3 shows the dam 210 and the stripper 220 include a plurality of alternating plates 219, 229, respectively, and gaps 218, 227, respectively, and each gap 218, 227 forms a cavity that is approximately wedge shaped. Preferably, each cavity receives a portion of one of the discs 112 with a clearance of about 0.040 inches at the outer diameter of the disc 112. Preferably, clearance is about 0.015 inches from the disc surface 180 and the respective plates 219, 229. The inner boundaries 242, 233 of the dam 210 and the stripper 220, respectively, are preferably arcuately shaped.

Referring to FIG. 4, the dam 210 and the stripper 220 of the air flow control device 200 are operably engaged and disengaged using engaging assembly 300. The engaging assembly 300 is preferably hydraulic or pneumatic cylinder that con be coupled and controlled vial electronic circuitry through the main controls of the multi-disc writer 100 (FIG. 1). The engaging assembly 300 includes an arm member 302 that engages cam 304 coupled to the pivot assembly 216 of the dam 210. Referring now to FIGS. 3 and 4, movement of the arm 302 rotates the cam 304. A linkage 306 is coupled to and follows movement of the cam 304. Thus when the arm 302 is positioned in an open position by the engaging assembly 300, the cam 304 and the linkage 306 are actuated such that the dam 210 and the stripper 212 are disengaged from the disc stack 110 of the multi-disc writer 100 (FIG. 1). Alternatively, when the arm 302 of the engaging assembly 300 is in closed position, the cam 304 and the linkage 306 operably rotate the dam 210 and the stripper 220 around their respective pivot points 216, 236. Referring to FIG. 5 gap 218 between adjacent plates 219 is preferably about 0.070 inches, or alternatively sized to provide the desired clearance between the disc surfaces 180 and the plates 219.

Referring to FIG. 5, when the dam 210 and the stripper 220 are engaged to the disc stack 110, air flow around and between the discs 112 is reduced because a significant portion of the air space between the discs is now replaced by plates 219, 229 as discs 112 are received into cavities formed by gaps 218, 227, This reduces the radial and tangential air flow in the disc stack 110, thereby reducing the turbulence in the region of the write heads 122, 121 (FIG. 1) of actuator assembly 120 (FIG. 1).

The dam 210 and the stripper 220 can be fabricated using various techniques. One method is to begin with a solid block of material for each section and electrodischarge machine the part. Machining in this manner allows the surface finish, which controls and affects turbulence, to be machined to exact tolerances. Furthermore, this method also allows the gap 218, 227 width between adjacent plates 219, 229 to be controlled. An example of the materials that could be used for the dam 210 and the stripper 220 of the example embodiment of the present invention include 300 and 400 Series stainless steel, electroless nickel-plated steel or aluminum or tool steel.

Figure 7:
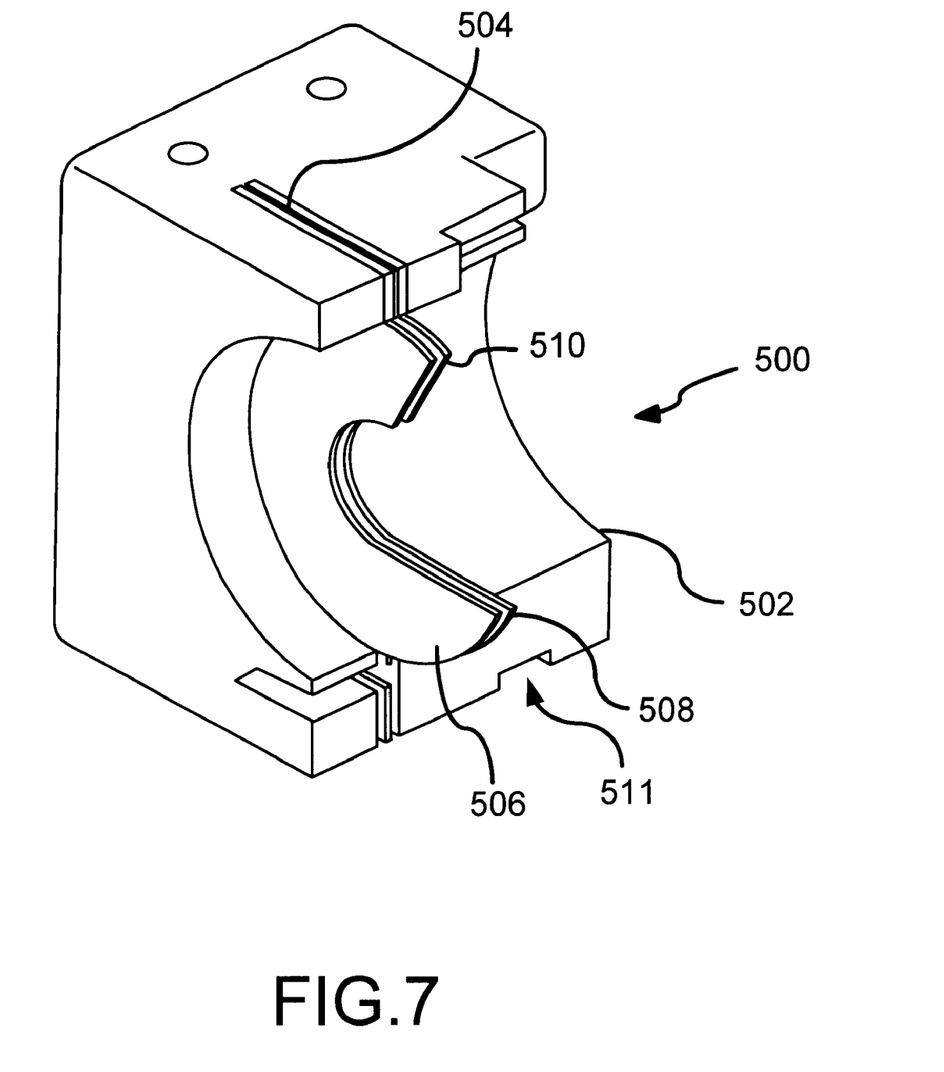
FIG. 7 is another example embodiment of an air flow control device of the present invention.

Alternatively, pins could be used to stack plates on pins separated by spacers. Referring to FIG. 7, shown as an alternative embodiment of an air flow control device of the present invention, an air flow control device 500 includes a base section 502 including a series of slots 504. The slots 504 receive the plates 506 having a wedged shaped section 510. Adjacent plates 506 form gaps 508 for receiving discs (not shown) in disc stack (not shown). The air flow control device 500 can be engaged and disengaged to disc stack by placing guide 511 on indexing device (not shown) thereby allowing air flow control device to move along indexing device.

Another aspect of the present embodiment is direct to a method of writing data onto an annular writeable surface of a plurality of discs. Discs are mounted into a coaxial stack. One or more dam plates are extended between a consecutive pair of the plurality of discs and adjacent to at least one of the writeable surfaces. Data is then written onto the selected surface while a first one of the dam plates overlaps enough of the selected surface so that the first dam plate limits a windage induced error in the written data. Preferably, the first dam plate overlaps at least 10 percent of the selected surface.

In another embodiment, the method can further include removing the plurality of discs from the coaxial stack and mounting the disc having a selected surface into the data handling system. The method further includes mounting the first dam plate on a base so that the first dam plate is pivotable about a first axis of rotation and also mounting a second one of the dam plates on the base so that the second dam plate is pivotable about a second axis of rotation. The method further includes writing many servo reference marks on the selected surface.

Alternatively characterized, another embodiment of the present invention is an air flow control (such as 200) device for a data handling system (such as 100). The data handling system includes a disc stack (such as 110) having a plurality of rotating discs (such as 112) on a spindle (such as 102). Each disc (such as 112) has at least one recording surface (such as 180) and each recording surface operably corresponds to the head (such as 121) of an actuator assembly (such as 120) for reading data from and writing data to the corresponding recording surface.

In yet another embodiment, the air flow control device includes a first air dam (such as 210) having an outer section including an inner wall and an outer wall. the air dam further includes a plurality of spaced plate (such as 219) sections disposed transverse from the inner wall of the outer section. The plates are substantially parallel and form gaps (such as 218) therebetween adjacent plates. Each gap forms a cavity that is capable of surrounding a corresponding section of a disc when the air dam is engaged with the disc stack. Each gap defining a cavity further includes an outer boundary (such as 240), a first edge boundary (such as 244), a second edge boundary (such as 246) and an inner boundary (such as 242). The outer boundary is preferably arcuately shaped and formed along the inner wall of the outer section. The first and second edge boundaries (such as 244, 246) extend transversely from the inner wall of the outer section, and the first edge boundary has a first end and a second end and the second edge boundary has a third and a fourth end. The inner boundary is generally arcuately shaped to accommodate spindle and extends between the second end of the first edge boundary and the fourth end of the second edge boundary. Additionally, the air flow control device can also include a second air dam section, (such as 220).

In another example embodiment, the present invention is directed to a method of writing data onto an annular writeable surface of a plurality of discs. The method includes a step of mounting the plurality of discs into a coaxial stack. Next, one or more dam plates are each extended between a consecutive pair of the plurality of discs and adjacent at least a selected one of the writeable surfaces. The method further includes a step of writing data onto the selected surface while a first one of the dam plates overlaps enough of the selected surface so that the first dam plate limits a windage-induced error in the written data.

In still another embodiment, the invention is directed to a data handling system including a plurality of discs operably mounted to a spindle. The spindle is removably supportable by a motor (such as 104) capable of rotating the plurality of discs. The data handling system also includes means for supporting at least one stationary baffle extending between two of the plurality of discs while the discs rotate, so as to reduce a windage-induced disturbance.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the baffle arrangement can be fabricated to combine the dam and stripper sections into a unitary arrangement. Numerous other changes may be made which will readily suggest themselves to those skilled in the art and which are encompassed in the spirit of the invention disclosed and as defined in the appended claims.

What is claimed is:

1. A windage suppression device for a data handling system that writes data to a rotating disc, the device comprising:
   an airflow control operably moveable between an engaged position and a disengaged position, the airflow control comprising spatially separated and substantially parallel plates defining a cavity between the plates, wherein in the engaged position a portion of the disc is receivingly engaged inside the cavity and in the disengaged position the disc is disposed outside the cavity.

2. The device of claim 1 wherein the data handling system includes a moveable actuator that positions a write element with respect to the disc,
   wherein the airflow control comprises a dam that is engageable with a portion of the disc downstream of the actuator with respect to the disc rotation.

3. The device of claim 2 wherein the airflow control comprises a stripper that is engageable with a portion of the disc upstream of the actuator with respect to the disc rotation.

4. The device of claim 3 wherein the dam and stripper are independently pivotally supported.

5. The device of claim 4 further comprising a linkage transferring movement between the dam and the stripper.

6. The device of claim 5 further comprising an engaging assembly connected to one of the dam and stripper for selective movement between the engaged and disengaged position.

7. The device of claim 4 wherein the dam and stripper rotate oppositely for engaging opposing radial portions of the disc.

8. The device of claim 7 wherein the dam and stripper comprise opposing edges, wherein in the disengaged position the clearance between the opposing edges is greater than a diameter of the disc.

9. The device of claim 1 wherein the airflow control comprises a pivoting support assembly for operative articulating engagement with the disc.

10. The device of claim 1 wherein the data handling system includes two or more discs supported in a disc stack, wherein the airflow control comprises a plurality of plates defining a plurality of cavities that are each respectively engageable with one of the discs.

11. The device of claim 1 wherein the airflow control comprises an arcuate outer boundary adjacent an edge of the disc.

12. The device of claim 1 wherein in the engaged position the cavity receivingly engages a radial portion of the disc including substantially the writeable surface of the disc.

13. A method of writing data to a rotating disc comprising:
   (a) moving an airflow control device to a disengaged position;
   (b) supporting the disc to a rotary element adapted to rotate the disc;
   (c) moving the airflow control device to an engaged position whereat a portion of the disc is receivingly engaged in a cavity defined by the airflow control device; and
   (d) moving a writing element to selected positions of the disc.

14. The method of claim 13 further comprising:
   (e) moving the airflow control device back to the disengaged position clearingly disposing the disc outside the cavity;
   (f) removing the disc from the rotary element.

15. The method of claim 13 wherein the moving the airflow control device comprises moving a dam that is engageable with a portion of the disc downstream of the writing element with respect to the disc rotation.

16. The method of claim 13 wherein the moving the airflow control device comprises moving a stripper that is engageable with a portion of the disc upstream of the writing element with respect to the disc rotation.

17. The method of claim 13 wherein the moving the airflow control device comprises pivotally moving the airflow control device.

18. A windage suppression device for a data handling system that writes data to a rotating disc, the device comprising:
   an airflow control comprising opposing plates defining a cavity therebetween the plates; and
   means for moving the airflow control between an engaged position and a disengaged position for selectively disposing the disc inside and outside, respectively, the cavity.

19. The device of claim 18, wherein the means for moving is characterized by engaging a dam portion of the airflow control with a portion of the disc downstream of a writing element with respect to the disc rotation and engaging a stripper portion of the airflow control with a portion of the disc upstream of the writing element.

20. The device of claim 19 an articulating arrangement for operably engaging and disengaging the first and second air dam sections with the discs, wherein each disc is partially enclosed and free to rotate within a corresponding cavity when the air dams are engaged wherein the means for moving is characterized by pivotal motion.

* * * * *